United States Patent [19]
Jackson

[11] 3,873,497
[45] Mar. 25, 1975

[54] STABILIZATION OF POLYAMIDES
[75] Inventor: John Ernest Jackson, Crickhowell, Wales
[73] Assignee: Imperial Chemical Industries Limited, London, England
[22] Filed: Apr. 2, 1971
[21] Appl. No.: 130,768

[30] Foreign Application Priority Data
Apr. 13, 1970 United Kingdom........... 17385/70

[52] U.S. Cl.. 260/45.75 R, 260/37 NP, 260/45.7 P, 260/45.7 PS, 260/45.9 R, 260/45.95 D
[51] Int. Cl............................................ C08g 51/58
[58] Field of Search.. 260/45.7 P, 45.75 R, 45.95 R, 260/953, 37 N, 45.9

[56] References Cited
UNITED STATES PATENTS
2,437,232  3/1948  Rothrock et al...................... 260/75

| | | | |
|---|---|---|---|
| 2,493,597 | 1/1950 | Rothrock et al................... | 260/45.7 |
| 2,510,777 | 6/1950 | Ceray............................... | 260/45.7 |
| 2,640,044 | 5/1953 | Stamatoff.......................... | 260/45.7 |
| 2,887,462 | 5/1959 | Van Oot........................... | 260/45.75 |
| 3,300,440 | 1/1967 | Prevorsek......................... | 260/45.7 |
| 3,324,071 | 6/1967 | Skoog et al........................ | 260/37 |
| 3,412,064 | 11/1968 | Brindell........................... | 260/45.95 |
| 3,441,575 | 4/1969 | Dexter et al..................... | 260/45.85 |

OTHER PUBLICATIONS
Organophosphorus Compounds, by G. M. Kosolapoff, John Wiley & Sons, Inc., 1950, pp. 180 and 196.

*Primary Examiner*—V. P. Hoke
*Attorney, Agent, or Firm*—Thomas J. Morgan; Robert J. Blanke

[57] ABSTRACT

Fibre-forming synthetic polyamides or copolyamides having improved stability imparted by defined class of phosphorus-containing phenols in combination with low amount of reducing phosphorus compounds.

8 Claims, No Drawings

STABILIZATION OF POLYAMIDES

The present invention relates to the stabilisation of high molecular weight fibre-forming synthetic linear polyamides or copolyamides against impairment of their properties by the action of heat and oxygen and by light, particularly when said polyamides are pigmented with titanium dioxide.

Synthetic linear polyamides and copolyamides, e.g. polyhexamethylene adipamide, are widely used in the manufacture of textile and other products, for instance yarns and fabrics. Such products are noted for their attractive properties, such as great strength, i.e. high tenacity. Prolonged exposure to light, however, as in the case of curtains hung at windows, gradually impairs the properties of such polymers. In order to stabilise said polymers against light deterioration, small quantities of various manganese salts may be incorporated into the polymer during manufacture, but these often tend to cause discolouration on bleaching. The addition of a phosphorous acid or a salt thereof, called hereinafter a reducing phosphorous compound, reduces such discolouration.

Said polymers are also apt to be discoloured and degraded by heat in the presence of oxygen, for instance during conventional heat setting processes. Heat stability, with or without manganese present, can be greatly improved by the addition of a suitable phenol, e.g. 1,1,3-Tris (1-hydroxy-3 methyl-6-tert butyl phenyl) butane along with a suitable reducing phosphorus compound.

A free phosphorous acid or an inorganic salt thereof may be employed as the reducing phosphorus compound but inorganic ions have a tendency to promote aggregation of the titania particles and impair the quality of the titania dispersion. Addition of organic reducing phosphorus compounds such as amine salts, on the other hand, while reducing the difficulties associated with dispersion of the titania, may give rise to difficulties in the yarn drawing process, such as formation of undesirable deposits on the apparatus.

Hence it is of considerable advantage to be able to reduce the addition of such reducing phosphorus compounds, both inorganic and organic, to a minimum amount consistent with obtaining the desired effect of such addition.

In practice hitherto, it has been found that the said reducing phosphorus compounds must be present in an amount equivalent to approximately 200 p.p.m. of phosphorus in the polymer, or considerably above this figure, for them to exert any appreciable effect. Applicants have now found that the addition of a phenolic antioxidant containing phosphorus at a suitable position in its molecule, in conjunction with a reducing phosphorus compound which is a phosphorous acid or a salt thereof, produces a surprising synergistic effect and permits the addition of much smaller amounts of said reducing phosphorus compound, thus overcoming the aforesaid disadvantages, while at the same time, surprisingly, at least preserving the advantageous stabilising effect.

The phosphorus-containing phenols used in the present invention have the general formula $(HO\phi O)_3PO_n$ where $\phi$ represents a benzene ring, with the OH groups positioned para- or ortho- to the phosphorus atom and with one or two alkyl groups adjacent to the phenolic OH group; $n = 0$ or $1$.

To function as an effective antioxidant for a polyamide the phenolic —OH group should be hindered by the presence of one, and preferably two, adjacent groups which are usually alkyl e.g. t-butyl. Whilst the hydroxyl group or groups may be positioned either para- or ortho- to the phosphorus atom in said phosphorus containing phenols, para-positioning is preferred.

The present invention accordingly presents a fibre-forming synthetic polyamide or copolyamide in which there have been incorporated from 5 to 100 parts per million parts by weight on the polyamide of phosphorus in the form of a phosphorous acid or a salt or ester thereof and 100 to 10,000 parts per million by weight on the polyamide of a phosphorus containing phenol of the general formula: $(HO\phi O)_3PO_n$ where $\phi$ represents a benzene ring, with the OH hydroxyl groups positioned para or ortho to the phosphorus atom and with one or two alkyl groups adjacent to the phenolic hydroxyl groups and where $n = 0$ or $1$.

With compositions according to the present invention the loss of amine ends when, for example, a polyamide fabric is submitted to a process of conventional heat setting, is markedly reduced. This aspect is of particular importance since such loss of amine ends is apt to give rise to stripiness in such a fabric when dyed with anionic dyestuffs.

The amounts of phosphorus, added in the form of the reducing phosphorus compound, phosphorus containing phenol, and manganese (when added), based on the polymer in weight proportion, used in carrying out the present invention, are as follows:

Phosphorus (introduced in the form of a reducing phosphorus compound): preferably between 5 and 100 parts per million.

Phosphorus-containing phenol: from 100 to 10,000 ppm and preferably from 400 to 1,000 parts per million.

Manganese (optionally introduced, in the form of a convenient salt for addition to the polymer or an insoluble coating on the titania): from 5 to 1,000 parts per million and preferably from 10 to 100 parts per million.

As already indicated, the invention is particularly adapted to polyamides containing titania or other pigments, and is applicable to both acid-stabilised and base-stabilised polyamides.

Conventional adjuvants may also be added to the polyamides at any convenient stage in their manufacture, for instance; dyes, pigments, dyestuff-formers, plasticisers, resins, antistatic agents such ethoxylated compounds and the like.

The invention includes shaped articles of the above high molecular weight linear polyamides containing phosphorus, a suitable phosphorus-containing phenol and optionally manganese, such as, for example, fibres, filaments, yarns, films, fabrics and other textile materials.

The reducing phosphorus acid or salt or ester thereof and the phosphorus-containing phenol may be incorporated in the polyamide by addition at any suitable stage in its manufacture. Preferably they are mixed with the polyamide starting materials before the polymerisation commences. Alternatively, they may be added to the finished polyamide, for instance by dusting them on to the polyamide chip prior to its melting. When titania is added, an insoluble manganese salt or other compound thereof may if required, be precipitated previously thereon so as to coat the titania particles.

The stabilising compounds of the present invention may be added, either separately or in combination, at suitable points in a continuous polymerisation process, such as that carried out in a pipe or coil. In this case the phosphorus-containing phenol is preferably added as a solution in aqueous caprolactam and the titania added as a slurry.

Use of the phosphorus-containing phenols of the present invention in a continuous polymerisation process appears to present a surprising advantage in reducing the formation of deposits in the polymerisation apparatus and its appended apparatus, thus permitting operation of such apparatus for long periods.

Examples of the high molecular weight linear polyamides (which expression is to be understood as including copolyamides) are listed below:
polyhexamethylene sebacamide
polyhexamethylene adipamide
polyoctamethylene adipamide
polydecamethylene sebacamide
polypentamethylene sebacamide
polydodecamethylene adipamide
poly-epsilon-caprolactam
poly-omega-aminoundecanoic acid
poly-m-xylylene adipamide
polyhexamethylene isophthalamide Copolyamides derived from the following starting materials may also be mentioned:
1. hexamethylene diammonium adipate and epsilon-caprolactam,
2. hexamethylene diammonium adipate and hexamethylene diammonium sebacate,
3. hexamethylene diammonium adipate and hexamethylene diammonium isophthalate,
4. hexamethylene diammonium terephthalate and dodecamethylene diammonium terephthalate,
5. the salts from hexamethylene diamine, adipic acid and 1,4-diphenyl adipic acid.

Suitable manganese salts, if required, are for instance, the lactate, acetate, ortho-phosphate and pyro-phosphate.

The reducing phosphorous compounds which may be added include ortho-phosphorous, meta-phosphorous, pyro-phosphorous and hypo-phosphorous acids, and also thio-phosphorus acids, e.g. dithio-orthophosphorous acid, and their organic and inorganic salts and their esters.

Examples of such organic salts and esters are:
hexamethylene diammonium di-hypophosphite
dimethyl hydrogen orthophosphite
tri-isodecyl orthophosphite
diethanolammonium hypophosphite
triethylammonium hypophosphite
triphenyl orthophosphite
trilauryl thiophosphite The following examples, in which the parts are parts by weight, are intended to illustrate, but not to limit, the invention.

EXAMPLES 1–23

6.6 nylon was prepared by the conventional method, from hexamethylene diamine and adipic acid, with the addition, at the beginning of polymerisation, of a slurry containing titanium dioxide pre-coated with manganese phosphate (AFN(2) $TiO_2$). The titanium dioxide was added in such amount that there was approximately 2 percent of it in the final polymer. Sodium hypophosphite was also added at the same time in various amounts per million of phosphorus on the polymer produced in some of the examples: in others no hypophosphite was added. The compositions tested and the results obtained are shown in the following table.

TABLE

Effect of heating undrawn 200/20 denier finish-free yarn for 30 seconds at 220°C

| Example | Additives | Initial Analysis A.E.G. eq/$10^6$g. | Initial Analysis 'b' chromaticity | Final Analysis A.E.G. eq/$10^6$g. | Final Analysis 'b' chromaticity | Change in Analysis % Loss A.E.G. | Change in Analysis Δb |
|---|---|---|---|---|---|---|---|
| 1 | 2% AFN(2) $TiO_2$ | 36.4 | 0.320 | 18.0 | 0.275 | 50.5 | 0.045 |
| 2 | 2% AFN(2) $TiO_2$ + 75 p.p.m. P as Na $H_2PO_2$ | 46.8 | 0.326 | 25.6 | 0.279 | 54.5 | 0.047 |
| 3 | 2% AFN(2) $TiO_2$ + 145 p.p.m. P as $NaH_2PO_2$ | 50.9 | 0.327 | 28.5 | 0.279 | 48.0 | 0.048 |
| 4 | 2% $TiO_2$, 50 p.p.m. Mn as acetate + 290 p.p.m. P as (diphenylisodecylphosphite) | 39.6 | 0.315 | 26.0 | 0.283 | 34.4 | 0.032 |
| 5 | 2% $TiO_2$, 50 p.p.m. Mn as acetate + 0.05% octadecyl-(3,5 ditert butyl-4-hydroxy phenyl) propionate | 40.3 | 0.317 | 22.7 | 0.270 | 43.5 | 0.047 |
| 6 | 2% $TiO_2$, 50 p.p.m. Mn as acetate + 0.05% Pentaerythritol tetra- (4-hydroxy-3,5 ditert, butylphenyl) propionate | 40.3 | 0.317 | 24.4 | 0.275 | 39.5 | 0.042 |
| 7 | 2 $TiO_2$, 50 p.p.m. Mn as acetate + 0.05% 1,1,3-tris (2' methyl-4'-hydroxy-5' tert, butylphenyl) butane | 46.5 | 0.321 | 29.6 | 0.273 | 36.5 | 0.048 |
| 8 | 2% AFN(2) $TiO_2$ + 0.05% tris (3,5 ditert, butyl-4 hydroxy phenyl phosphate) | 47.2 | 0.321 | 29.3 | 0.276 | 38.0 | 0.045 |
| 9 | 2% AFN(2) $TiO_2$, 0.05% 2,2'-methylene bis (4-methyl-6, tert butyl phenol) + 75 p.p.m. P as $NaH_2PO_2$ | 59.1 | 0.326 | 27.6 | 0.279 | 53.5 | 0.047 |
| 10 | 2% AFN(2) $TiO_2$, 0.05% 1,3,5-trimethyl - 2,4,6-tris (3,5 ditert butyl-4-hydroxy benzyl) benzene + 75 p.p.m. as $NaH_2PO_2$ | 43.1 | 0.318 | 25.6 | 0.271 | 41.0 | 0.047 |

TABLE – Continued

Effect of heating undrawn 200/20 denier finish-free yarn for 30 seconds at 220°C

| Example | Additives | Initial Analysis A.E.G. eq/$10^6$g. | Initial Analysis 'b' chromaticity | Final Analysis A.E.G. eq/$10^6$g. | Final Analysis 'b' chromaticity | Change in Analysis % Loss A.E.G. | Change in Analysis Δb |
|---|---|---|---|---|---|---|---|
| 11 | 2% AFN(2) TiO$_2$, 0.05% 1,1,3-tris (2' methyl-4' hydroxy-5' tert, butyl phenyl)butane + 75 p.p.m. P as NaH$_2$PO$_2$ | 45.5 | 0.321 | 26.3 | 0.275 | 42.0 | 0.046 |
| 12 | 2% AFN(2) TiO$_2$, 0.05% tris (3,5 di, tert, butyl-4-hydroxy phenyl phosphate) + 70 p.p.m. P as NaH$_2$PO$_2$ | 40.8 | 0.318 | 37.4 | 0.305 | 8.3 | 0.013 |
| 13 | 2% AFN(2) TiO$_2$, 0.1% tris (3,5 di, tert, butyl-4-hydroxy phenyl phosphate) + 70 p.p.m. P as NaH$_2$PO$_2$ | 49.3 | 0.324 | 42.5 | 0.300 | 13.8 | 0.024 |
| 14 | 2% AFN(2) TiO$_2$, 0.15% tris (3,5 di, tert, butyl-4-hydroxy phenyl phosphate) + 70 p.p.m. P as NaH$_2$PO$_2$ | 40.4 | 0.312 | 39.2 | 0.293 | 15.5 | 0.019 |
| 15 | 2% AFN(2) TiO$_2$, 0.05% tris 2,5 di, tert butyl-4-hydroxy phenyl) phosphite + 75 p.p.m. P as NaH$_2$PO$_2$ | 45.8 | 0.325 | 36.6 | 0.293 | 20% | 0.032 |
| 16 | 2% AFN(2) TiO$_2$, 0.05% (2,5 di, tert, amyl-4-hydroxy-phenyl) phosphite + 75 p.p.m. P as NaH$_2$PO$_2$ | 45.9 | 0.325 | 36.2 | 0.296 | 21% | 0.029 |
| 17 | 2% AFN(2) TiO$_2$, 0.05% 2,2'-methylene bis (4 methyl-6-tert, butylphenol) + 145 p.p.m. P as NaH$_2$PO$_2$ | 42.3 | 0.325 | 23.0 | 0.274 | 45.5 | 0.041 |
| 18 | 2% AFN(2) TiO$_2$, 0.05% 1,3,5 tri methyl-2,4-6-tris (3,5 di tert, butyl-4-hydroxy benzyl) benzene + 145 p.p.m. P as NaH$_2$PO$_2$ | 40.0 | 0.326 | 25.9 | 0.282 | 35.2 | 0.044 |
| 19 | 2% AFN(2) TiO$_2$, 0.05% 1,1,3, tris-(2' methyl-4'hydroxy-5-tert butylphenyl) butane + 145 p.p.m. P as NaH$_2$PO$_2$ | 44.0 | 0.320 | 29.4 | 0.285 | 33.2 | 0.035 |
| 20 | 2% AFN(2) TiO$_2$, 0.05% tris (3,5 di, tert, butyl-4-hydroxy phenyl) phosphate + 145 p.p.m. P as NaH$_2$PO$_2$ | 38.3 | 0.322 | 35.2 | 0.305 | 10.2 | 0.017 |
| 21 | 2% AFN(2) TiO$_2$, 0.05% tris (2,5 di, tert, butyl 4 hydroxy phenyl) phosphite + 145 p.p.m. P as NaH$_2$PO$_2$ | 41.8 | 0.325 | 34.9 | 0.298 | 16.5 | 0.027 |
| 22 | 2% AFN(2) TiO$_2$, 0.05% tris (2,5 di-tert, amyl-4-hydroxy phenyl) phosphite + 145 p.p.m. P as NaH$_2$PO$_2$ | 43.9 | 0.324 | 39.3 | 0.305 | 10.5 | 0.019 |
| 23 | 0.3% AFN(2) TiO$_2$, + 0.05% tris (3,5 di-tert, butyl-4 hydroxy phenyl) phosphite + 30 p.p.m. P as NaH$_2$PO$_2$ | 46.2 | 0.321 | 38.9 | 0.291 | 15.8 | 0.030 |
| 24 | 2% AFN(2) TiO$_2$ + 0.05% tris (2,5 di-tert butyl 4 hydroxy phenyl) phosphite | 43.9 | 0.323 | 24.0 | 0.278 | 45.0 | 0.045 |
| 25 | 2% AFN(2) TiO$_2$ + 0.05% tris (2,5 di-tert amyl-4-hydroxy phenyl) phosphite | 46.1 | 0.323 | 27.3 | 0.276 | 43.0 | 0.047 |
| 26 | 2% AFN(3) + 0.05% tris (3,5 di-tert butyl-4-hydroxy phenyl) phosphate + 75 p.p.m. P as Ba (H$_2$PO$_2$)$_2$ | 45.5 | 0.325 | 42.5 | 0.311 | 3.0 | 0.014 |
| 27 | 2% AFN(3) + 0.05% tris (3,5 di-tert-butyl-4-hydroxy phenyl) phosphate + 75 p.p.m. P as Mn (H$_2$PO$_2$)$_2$ | 48.7 | 0.320 | 43.9 | 0.307 | 9.9 | 0.013 |
| 28 | 2% AFN(3) + 0.05% tris (3,5 di-tert butyl-4-hydroxy phenyl) phosphate + 75 p.p.m. P as di-isodecyl pentaerythritol diphosphite | 49.2 | 0.322 | 43.3 | 0.307 | 12.0 | 0.015 |
| 29 | 2% AFN(3) + 0.05% tris (3,5 di-tert butyl-4-hydroxy phenyl) phosphate + 75 p.p.m. P as bis-nonylphenyl phenylphosphite | 47.4 | 0.321 | 42.3 | 0.307 | 10.8 | 0.014 |
| 30 | 2% AFN(3) + 0.05% tris (3,5 di-tert butyl-4-hydroxy phenyl) phosphate + 75 p.p.m. P as di-isodecyl phenyl phosphite | 46.9 | 0.321 | 42.4 | 0.308 | 9.6 | 0.013 |
| 31 | 2% AFN(3) + 0.05% tris (3,5 di-tert butyl-4-hydroxy phenyl) phosphate + 0.1% Zinc di-isopropyl dithiophosphate | 47.4 | 0.320 | 41.4 | 0.303 | 12.7 | 0.017 |

TABLE – Continued

Effect of heating undrawn 200/20 denier finish-free yarn for 30 seconds at 220°C

| Ex- ample | Additives | Initial Analysis | | Final Analysis | | Change in Analysis | |
|---|---|---|---|---|---|---|---|
| | | A.E.G. eq/10⁶g. | 'b' chromat- icity | A.E.G. eq/10⁶g. | 'b' chromat- icity | % Loss A.E.G. | Δb |
| 32 | 2% AFN(3) + 0.05% tris (3,5 di-tert butyl-4-hydroxy phenyl) phosphate + 0.2% Zinc di-isopropyl dithiophosphate | 44.3 | 0.323 | 39.4 | 0.310 | 11.0 | 0.013 |

200 denier, 20-filament yarns were melt spun from the polymers produced in each case and drawn to 70 denier. Before drawing, samples of said yarns, free of finish, were tested for amine end group content (called AEG) and Relative Viscosity (R.V.) in the conventional manner, as well as for whiteness. The whiteness of the yarn was measured in terms of 'b' chromaticity on a Meco Colormaster Mark V colorimeter, (obtainable from Manufacturers Engineering & Equipment Corporation, Warrington, Pa. U.S.A.) using the rotating dish assembly. The colorimeter was pre-calibrated. Perfect whiteness was denoted by a value of 0.333. The yarns were then heated in air at 220°C for 30 seconds and the above mentioned tests again carried out.

Referring to the Table it will be seen that the addition of either a reducing phosphorus compound on its own, even in large amounts, (Examples 2, 3, 4 and 24 and 25) or of a phenolic antioxidant without a reducing phosphorous compound, whether this phenolic antioxidant belongs to the members of the prior art (Examples 5, 6 and 7) or to those of the present invention (Example 8), has little effect on the stability of the yarn to heat and oxygen as compared with the control yarn of Example 1. Examples 12–16, 20–22 and 26–32 on the other hand illustrate the very striking synergistic effect taking place in the compositions of the present invention in conferring on the polyamide a high degree of stability to heat and oxygen (as indicated by AEG loss and Δb) at concentrations of the reducing phosphorus compound as low as 70 p.p.m. (as P), as compared with phenolic antioxidant not of the present invention in combination with reducing phosphorus compounds (Examples 9–11 and 17–19) even when the concentration of the latter is as high as 146 p.p.m. (as P). With respect to the latter 1,1,3-tris (1-hydroxy-3'-methyl-6-tert butyl phenyl) butane is well known to be a very effective antioxidant.

Example 23 shows that, surprisingly, yarn stable to heat and oxygen is obtained with the compositions of the present invention, even with only 30 p.p.m. phosphorus present as sodium hypophosphite, whereas when no phenol was present (Examples 2 and 3) the yarn showed poor stability, indicating a very marked and surprising synergistic effect.

A difference of 0.002 in the value of the 'b' chromaticity is visible to the naked eye.

I claim:

1. An improved fibre-forming synthetic polyamide wherein the improvement consists in that in said polyamide there have been incorporated from 5 to 100 parts per million parts by weight on the polyamide of reducing phosphorus in the form of a phosphorous acid or a salt or ester thereof and 100 to 10,000 parts per million by weight on the polyamide of a phosphorus-containing phenol of the general formula: $(HO\phi O)_3PO$ where $\phi$ represents a benzene ring, with the OH hydroxyl groups positioned para- or ortho- to the phosphorus atom and with on or two alkyl groups adjacent to the phenolic hydroxyl groups.

2. A polyamide according to claim 1 wherein there have been incorporated from 400 to 1,000 parts per million of said phosphorus-containing phenol.

3. A polyamide as claimed in claim 1 wherein there have been incorporated from 5 to 1,000 parts per million of manganese.

4. A polyamide as claimed in claim 1 wherein there have been incorporated from 10 to 100 parts per million of manganese.

5. A polyamide as claimed in claim 1 wherein hydroxyl groups of the phosphorus-containing phenol are located symmetrically on benzene rings in the para-positions to the P atom.

6. A polyamide as claimed in claim 1 wherein said polyamide is polyhexamethylene adipamide, with or without added pigment.

7. Fibres, filaments, yarns, fabrics and other textile materials shaped from the polyamides as claimed in claim 1.

8. A polyamide as claimed in claim 1 wherein there have been incorporated from 50 to 100 parts per million parts by weight of polyamide of said phosphorus in the form of a phosphorous acid or salt or ester thereof.

* * * * *